(12) United States Patent
Kang et al.

(10) Patent No.: US 7,968,222 B2
(45) Date of Patent: Jun. 28, 2011

(54) ASSEMBLABLE SPACER FOR PREPARATION OF BATTERY MODULE

(75) Inventors: Dongha Kang, Seoul (KR); Joonyoung Shin, Incheon (KR); Jaesik Chung, Seoul (KR)

(73) Assignee: LG Chem, Ltd. (KR)

( * ) Notice: Subject to any disclaimer, the term of this patent is extended or adjusted under 35 U.S.C. 154(b) by 1035 days.

(21) Appl. No.: 11/566,780

(22) Filed: Dec. 5, 2006

(65) Prior Publication Data
US 2007/0148536 A1 Jun. 28, 2007

(30) Foreign Application Priority Data

Dec. 8, 2005 (KR) .................. 10-2005-0119235

(51) Int. Cl.
*H01M 2/10* (2006.01)
(52) U.S. Cl. .................. 429/99; 429/100; 429/97
(58) Field of Classification Search .................. None
See application file for complete search history.

(56) References Cited

U.S. PATENT DOCUMENTS

| | | | |
|---|---|---|---|
| 4,510,215 A * | 4/1985 | Adam | 429/99 |
| 5,585,710 A * | 12/1996 | Nakamura et al. | 320/112 |
| 6,733,919 B1 * | 5/2004 | Nguyen et al. | 429/99 |

FOREIGN PATENT DOCUMENTS

| | | |
|---|---|---|
| JP | 07-085896 | 3/1995 |
| JP | 2000-100401 | 4/2000 |
| JP | 2002-170533 | 6/2002 |
| JP | 2004-031284 | 1/2004 |
| KR | 10-2005-0000384 | 1/2005 |
| KR | 10-2005-0026162 | 3/2005 |

\* cited by examiner

*Primary Examiner* — Keith Walker
(74) *Attorney, Agent, or Firm* — Cantor Colburn LLP

(57) ABSTRACT

Disclosed herein is a spacer including battery receiving parts formed at opposite major surfaces of a frame, respectively, the battery receiving parts having semi-cylindrical inner structures corresponding to outer surfaces of the cylindrical batteries, and assemblable coupling parts formed at opposite sides of the battery receiving parts, respectively, the assemblable coupling parts being engageable with and disengageable from the corresponding ones. The spacer according to the present invention has the effect of stably mounting cylindrical unit cells while preventing the occurrence of internal short circuits, manufacturing a structurally stable battery module, and effectively removing heat generated during charge of the cylindrical unit cells. Furthermore, the spacers can be easily assembled with each other depending upon the number of the unit cells required in manufacturing the battery module.

6 Claims, 4 Drawing Sheets

ASSEMBLABLE SPACER FOR PREPARATION OF BATTERY MODULE

FIELD OF THE INVENTION

The present invention relates to an assemblable spacer used to prepare a battery module using cylindrical batteries as unit cells, and, more particularly, to a spacer including battery receiving parts formed at opposite major surfaces of a frame, respectively, the battery receiving parts having semi-cylindrical inner structures corresponding to outer surfaces of the cylindrical batteries, and assemblable coupling parts formed at opposite sides of the battery receiving parts, respectively, the assemblable coupling parts being engageable with and disengageable from the corresponding ones, and a battery module including the spacer.

BACKGROUND OF THE INVENTION

Recently, a secondary battery, which can be charged and discharged, has been widely used as an energy source for wireless mobile devices. Also, the secondary battery has attracted considerable attention as an energy source for electric vehicles and hybrid electric vehicles, which have been developed to solve problems, such as air pollution, caused by existing gasoline and diesel vehicles using fossil fuel.

Small-sized mobile devices use one or several battery cells for each device. On the other hand, medium- or large-sized devices, such as vehicles, use a medium- or large-sized battery module having a plurality of battery cells electrically connected with each other because high output and large capacity are necessary for the medium- or large-sized devices.

The battery module is a battery structure in which a plurality of unit cells are electrically connected in series and/or in parallel with each other. It is very important for the battery module to maintain the arrangement structure of the unit cells such that the unit cells can be sequentially connected with each other.

Especially, cylindrical secondary batteries, which are used as the unit cells of the battery module, have great difficulty in maintaining the arrangement structure due to the appearance characteristics thereof. For this reason, the use of additional fixing members is necessary for the cylindrical secondary batteries. For example, there has normally been used a method of arranging cylindrical secondary batteries and fixing the arranged cylindrical secondary batteries with fixing tape or coating the arranged cylindrical secondary batteries with plastic so as to maintain the arrangement structure of the cylindrical secondary batteries. According to circumstances, double-sided adhesive tape may be attached between the unit cells so as to further increase the coupling force between the unit cells.

However, the strength of the fixing tape and the plastic coating is small, and therefore, the possibility is very high that the fixing tape and the plastic coating are damaged or broken. Consequently, the fixing tape and the plastic coating are not suitable for stably maintaining the arrangement structure of the unit cells. In addition, when the battery module is constructed using the fixing tape or the double-sided adhesive tape, a process for detaching and attaching the fixing tape or the double-sided adhesive tape is complicated and troublesome, which is a factor that increases the time necessary for constructing the battery module.

Generally, it is possible for the battery module to have various outputs and capacities by adjusting the number of the unit cells connected with each other. For the cylindrical unit cells, however, a fixing member for maintaining the arrangement structure of the cylindrical unit cells is requisite. Consequently, there is a problem that various kinds of fixing members must be manufactured depending upon the number of unit cells to be assembled when the battery module is constructed with the cylindrical unit cells.

In this connection, Japanese Unexamined Patent Publication No. 2000-100401, Japanese Patent Registration No. 3679705, Japanese Unexamined Patent Publication No. 1995-85896, Japanese Unexamined Patent Publication No. 2004-31284, Korean Patent Registration No. 497252, and Korean Unexamined Patent Publication No. 2005-384 disclose a member used to mount two cylindrical batteries. However, these conventional mounting members have several problems in that it is not possible to secure the stable mounting of the cylindrical batteries due to the structural characteristics of the mounting members, and additional members are necessary to connect a plurality of mounting members, as required, when a battery module is prepared.

For example, Japanese Unexamined Patent Publication No. 2000-100401 discloses a structure in which a passageway is formed through opposite sides of a spacer at predetermined regions of the spacer excluding opposite ends of the spacer so as to prevent the deterioration of the charge and discharge characteristics due to the accumulation of heat generated when charging and discharging a battery module including cylindrical secondary batteries tightly attached to each other. With this structure, however, a plurality of spacers must be coupled with each other by welding, by bonding, or by additional coupling members, when the plurality of spacers are used to manufacture a battery module, with the result that the manufacturing process is complicated, and therefore, the production efficiency is lowered. Furthermore, when the spacers are coupled with each other, for example, by spot welding, as disclosed in the above-mentioned conventional arts, the welded parts and the terminal parts of the batteries may be brought into contact with each other due to external impact with the result that external short circuits may occur. When the battery module constructed using the spacers is mounted in a vehicle, the batteries of the battery module may explode or catch fire during the use of the battery module. Consequently, the disclosed spacers seriously affect the safety of the battery module.

SUMMARY OF THE INVENTION

Therefore, the present invention has been made to solve the above problems, and other technical problems that have yet to be resolved.

Specifically, it is an object of the present invention to provide a spacer that is capable of stably mounting cylindrical unit cells while preventing the occurrence of internal short circuits, manufacturing a structurally stable battery module, and effectively removing heat generated during charge of the cylindrical unit cells.

It is another object of the present invention to provide a spacer constructed such that the spacers can be easily assembled with each other depending upon the number of the unit cells required in manufacturing the battery module.

It is a further object of the present invention to provide a battery module including the above-described spacer, whereby the battery module has a stable and compact structure.

In accordance with one aspect of the present invention, the above and other objects can be accomplished by the provision of a spacer used to prepare a battery module using cylindrical batteries as unit cells, wherein the spacer comprises: battery receiving parts formed at opposite major surfaces of a frame, respectively, the battery receiving parts having semi-cylindrical inner structures corresponding to outer surfaces of the cylindrical batteries; and assemblable coupling parts formed at opposite sides of the battery receiving parts, respectively, the assemblable coupling parts being engageable with and disengageable from the corresponding ones.

In the assemblable spacer according to the present invention, the battery receiving parts are formed at the opposite major surfaces (the upper and lower surfaces) of the frame member, respectively. Consequently, it is possible to mount two unit cells to a single spacer. According to circumstances, a plurality of battery receiving parts may be formed at each major surface of the frame member such that two or more unit cells can be received in the corresponding battery receiving parts. For example, when two battery receiving parts are formed at each major surface of the frame member, a total of four unit cells can be mounted to a single spacer. The battery receiving parts formed respectively at the upper and lower surfaces of the frame are spaced apart from each other due to the frame, and therefore, a possibility of the occurrence of short circuits is very low.

Also, the assemblable coupling parts, which are engageable with and disengageable from the corresponding ones, are formed at the opposite sides of the battery receiving parts, respectively. Consequently, it is possible to couple and separate neighboring spacers adjacent to each other in the lateral direction to and from each other through the engagement and disengagement of the assemblable coupling parts. As a result, it is not necessary to couple the spacers with each other using additional coupling members or adhesive, and therefore, the spacers can be easily assembled with each other depending upon the number of the unit cells required in manufacturing a medium- or large-sized device.

The assemblable coupling parts may have various structures. As an example, each of the assemblable coupling parts may include an engageable and disengageable hook formed at one side of each of the battery receiving parts, and an engageable and disengageable groove formed at the other side of each of the battery receiving parts, the engageable and disengageable groove having a structure corresponding to the engageable and disengageable hook. As another example, each of the assemblable coupling parts may include a slide coupling-type protrusion formed at one side of each of the battery receiving parts, and a slide coupling-type depression formed at the other side of each of the battery receiving parts, the slide coupling-type depression having a structure corresponding to the slide coupling-type protrusion.

Consequently, a plurality of spacers having the above-described assemblable coupling parts can be easily assembled with each other by the coupling between the corresponding assemblable coupling parts. For example, when the hooks or the protrusions are formed at the right side of a first spacer, and the grooves or the depressions are formed at the left side of the first spacer, the hooks or the protrusions are formed at the right side of a second spacer which is coupled with the first spacer, and the grooves or the depressions are formed at the left side of the second spacer. Consequently, the two spacers can be coupled with each other through the engagement of the hooks or the protrusions formed at the right side of the second spacer in the grooves or the depressions formed at the left side of the first spacer. In the same manner, the third spacer can be coupled with the second spacer.

Preferably, the outermost spacer, which is used as the outermost member of a battery module when the battery module is constructed using a plurality of spacers having the assemblable coupling parts formed at the opposite sides thereof, is not provided at the side thereof constituting the outer surface of the battery module with assemblable coupling parts, or is provided at the side thereof constituting the outer surface of the battery module with female-type coupling parts. Specifically, the side of the outermost spacer constituting the outer surface of the battery module is prevented from protruding outward, whereby the structural efficiency is improved during the assembly of the battery module, and the assembly of the battery module is interfered with.

The female-type coupling parts may be the engageable and disengageable groove corresponding to the hooks as described above, or the slide coupling-type depressions corresponding to the slide coupling-type protrusions as described above. For example, when the first spacer and the third spacer are the left-side outermost member and the right-side outermost member, respectively, the first spacer is provided at the right side thereof, to which the second spacer is coupled, with the hooks or the protrusions, and the third spacer is provided at the left side thereof, to which the second spacer is coupled, with the hooks or the protrusions.

In the above-described structure, it is preferable that the assemblable coupling parts be formed at the opposite sides of the spacer adjacent to the opposite ends of the spacer in a pair for each side of the spacer, and depressions be formed in the middle parts of the spacer, where the assemblable coupling parts are not formed, at the opposite sides of the spacer, respectively. The depressions form empty spaces when the spacers are coupled with each other in the lateral direction. Consequently, the depressions may be used as spaces for receiving thermistors for measuring the temperature of the unit cells.

In a preferred embodiment, the spacer further comprises skirts formed at the battery receiving parts to stably fix the unit cells, to prevent the occurrence of external short circuits, and to partially surround opposite ends of the unit cells.

Preferably, each of the skirts is formed of a U-shaped plate to partially surround circular outer circumferential surfaces of the unit cells while exposing electrode terminals of the cylindrical unit cells. The U-shaped skirts do not affect the electrical connection between the unit cells, and restrains the vertical movement of the unit cells, thereby stably fixing the unit cells.

According to circumstances, a through-hole may be formed through the middle parts of the battery receiving parts such that the unit cells mounted respectively at the upper and lower surfaces of the frame communicate with each other through the through-hole. The through-hole may be used as a coolant flow channel for removing heat generated from the unit cells during the charge of the unit cells. The shape, the size, and the number of the through-holes are not particularly restricted. That is to say, the through-holes have various shapes, sizes, and numbers.

The battery receiving parts formed at the upper and lower surfaces of the frame may be spaced apart from each other except semi-circular contact regions thereof. Preferably, the battery receiving part (A) located at the upper surface of the frame and the battery receiving part (B) located at the lower surface of the frame are spaced apart from each other except contact regions of the upper and lower battery receiving parts where circular outer circumferential surfaces of the upper and lower battery receiving parts join, whereby grooves are formed in the opposite sides of the spacer in the longitudinal direction. When a plurality of spacers are assembled with each other so as to manufacture a battery module, horizontal passageways are formed by the grooves. These horizontal passageways may be used as flow channels for a coolant, such as air. Consequently, heat generated from the unit cells during the discharge of the unit cells is effectively removed by the horizontal passageways uniformly formed in the battery module.

In accordance with another aspect of the present invention, there is provided a battery module having cylindrical batteries mounted to a structure formed by assembling a plurality of spacers with the above-stated construction.

The battery module according to the present invention may be used in a medium- or large-sized battery system requiring a combination of two or more batteries. For example, the battery module according to the present invention may be widely used in a battery system for medium-sized devices, such as laptop computers, and in a battery system for large-sized devices, such as electric vehicles and hybrid electric vehicles.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
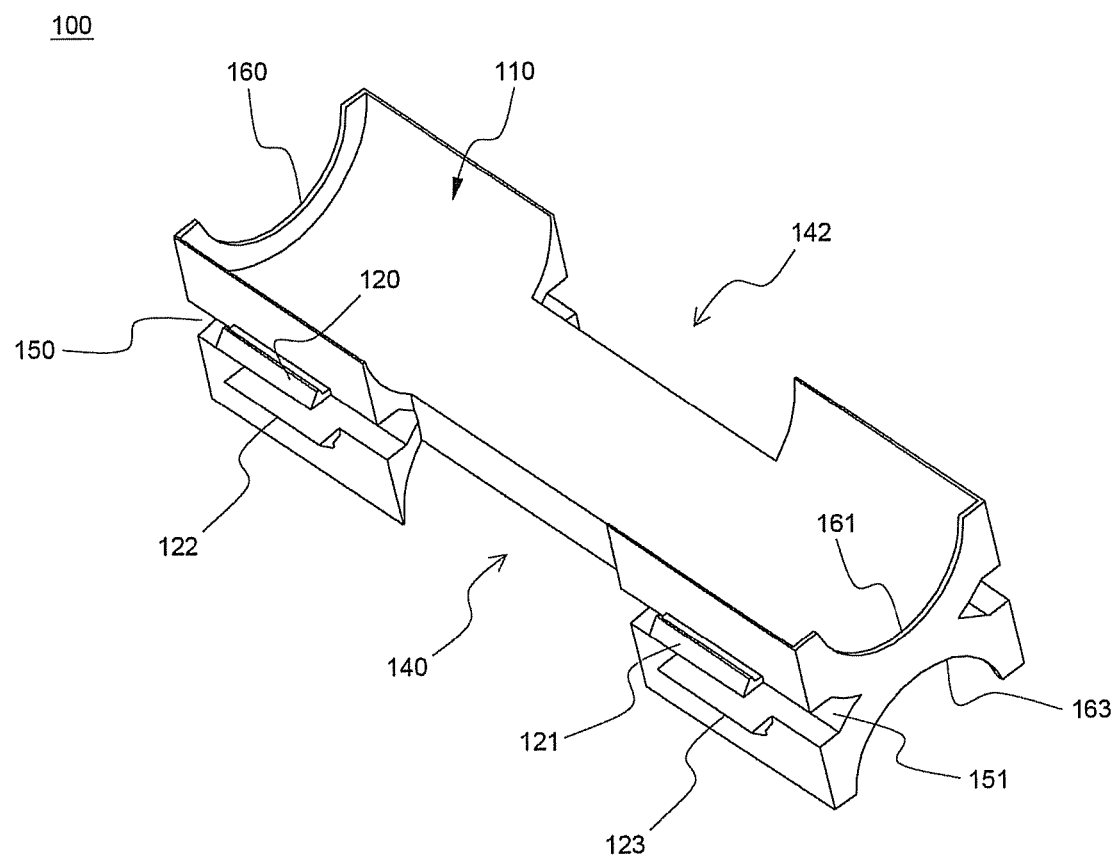
FIG. 1 is a perspective view illustrating an assemblable spacer for battery module preparation according to a preferred embodiment of the present invention.
Figure 2:
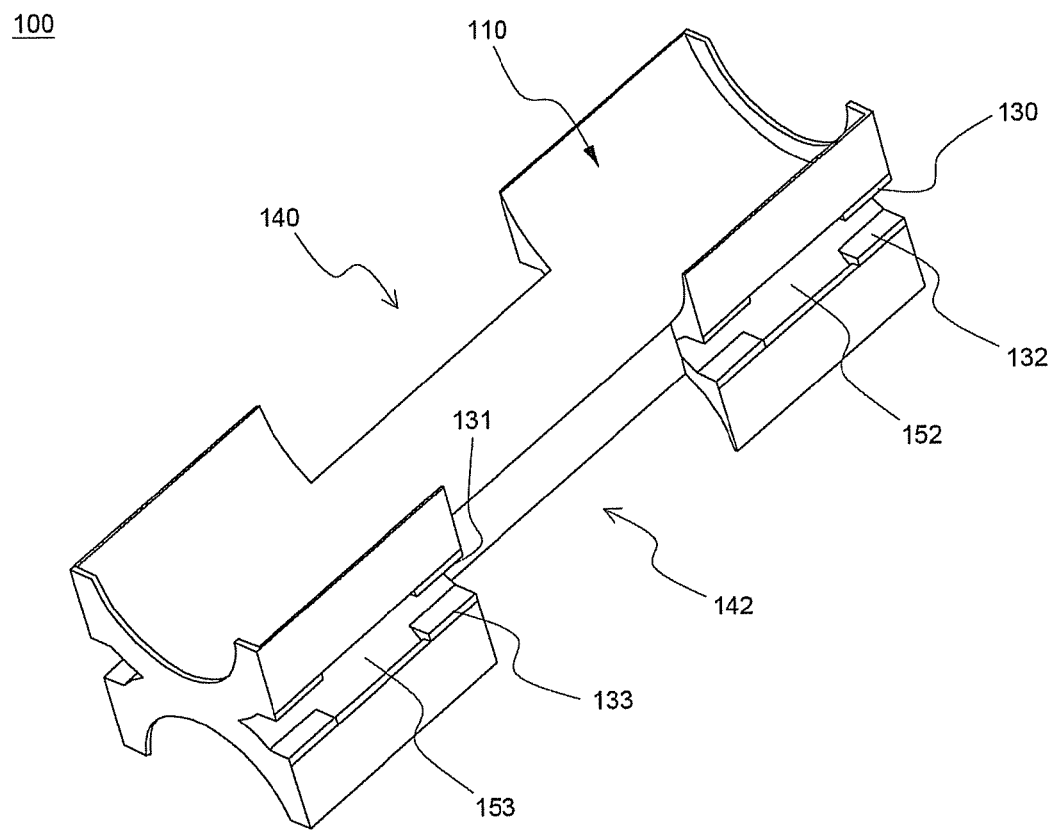
FIG. 2 is a perspective view of the assemblable spacer of FIG. 1 when the assemblable spacer is viewed in the opposite direction.
Figure 3:
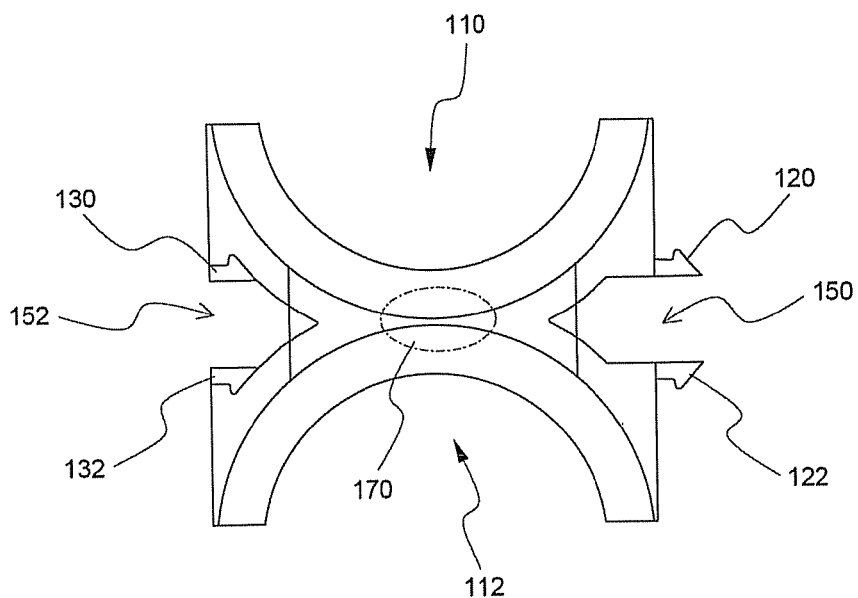
FIGS. 3 and 4 are a vertical sectional view and a see-through view of the assemblable spacer of FIG. 1, respectively.
Figure 4:
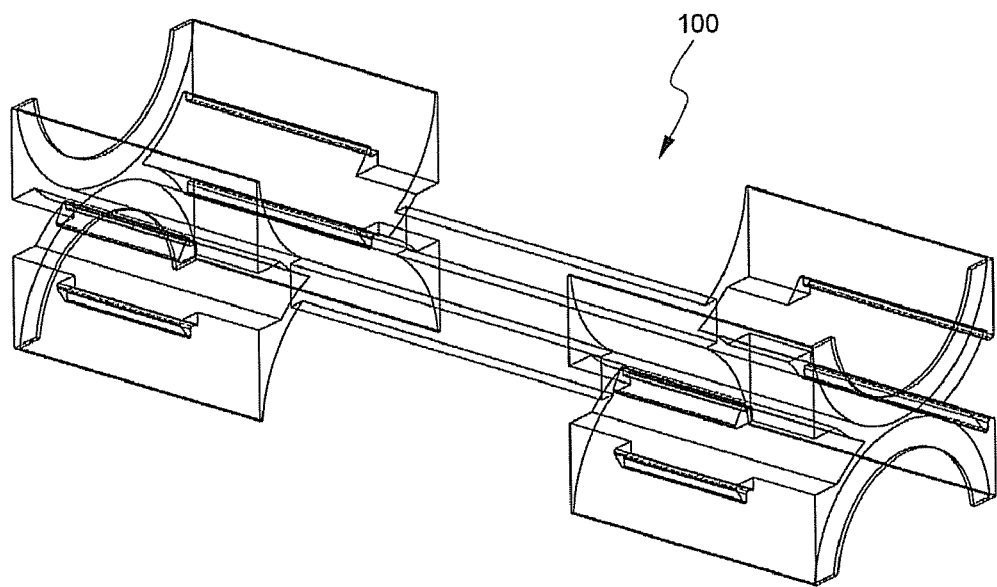

FIGS. 1 and 2 are perspective views illustrating an assemblable spacer for battery module preparation according to a preferred embodiment of the present invention when the spacer is viewed in opposite directions, respectively, and FIGS. 3 and 4 are a vertical sectional view and a see-through view of the assemblable spacer of FIG. 1, respectively.

Referring first to FIG. 1, an assemblable spacer 100 includes semi-cylindrical battery receiving parts 110 and 112 formed at opposite major surfaces, i.e., the upper and lower surfaces, of a frame. The semi-cylindrical inner spaces of the respective battery receiving parts 110 and 112 correspond to the outer surfaces of unit cells (not shown), and therefore, the unit cells can be stably received in the semi-cylindrical inner spaces of the battery receiving parts 110 and 112, respectively. Here, the term "semi-cylindrical shape" means a shape to surround approximately ½ of the circular outer circumferential surface of each cylindrical unit cell, and therefore, it should be understood that the semi-cylindrical shape does not mean the shape exactly corresponding to ½ of the cylindrical shape.

The unit cells (not shown) are received in the upper battery receiving part 110 and the lower battery receiving part 112, respectively. Consequently, two unit cells can be mounted to a single spacer 100.

The battery receiving parts 110 and 112 are provided at the upper and lower ends thereof with skirts 160, 161, 162, and 163, which are formed of a U-shaped plate. The skirts 160, 161, 162, and 163 are constructed in a structure to partially surround the circular outer circumferential surfaces of the opposite ends of the unit cells while exposing electrode terminals of the cylindrical unit cells.

At the left sides of the battery receiving parts 110 and 112 are formed coupling-type hooks 120, 121, 122, and 123 for coupling the spacer 100 with another spacer, respectively. At the right sides of the battery receiving parts 110 and 112 are formed grooves 130, 131, 132, and 133 corresponding to the hooks 120, 121, 122, and 123, respectively, as shown in FIG. 2.

The coupling-type hooks 120, 121, 122, and 123 and the corresponding grooves 130, 131, 132, and 133 are located in pairs adjacent to the opposite ends of the frame. In the middle part of the frame are formed depressions 140 and 142. Consequently, when a plurality of spacers 100 are connected with each other in the lateral direction, the depressions 140 and 142 form empty spaces, in which thermistors for measuring the temperature of the unit cells may be mounted.

The upper and lower battery receiving parts 110 and 112 are constructed in the form corresponding to the circular outer circumferential surfaces of the unit cells. Consequently, the assemblable coupling parts, i.e., the hooks 120, 121, 122, and 123 and the grooves 130, 131, 132, and 133, are spaced apart from each other at the opposite sides of the upper and lower battery receiving parts 110 and 112 except the contact regions of the middle parts of the upper and lower battery receiving parts 110 and 112 where two semicircles join when viewed in section. As a result, grooves 150, 151, 152, and 153 are formed between the corresponding hooks 120, 121, 122, and 123 and between the corresponding grooves 130, 131, 132, and 133. The grooves 150, 151, 152, and 153 may be used as flow channels for a coolant, such as air.

The coupling structure of the hooks and the grooves and the shape of the grooves are illustrated in more detail in FIG. 3. As shown in FIG. 3, a pair of hooks 120 and 122 formed at one side of the spacer 100 and a pair of the grooves 130 and 132 formed at the other side of the spacer 100 are constructed in a structure in which the hooks 120 and 122 and the grooves 130 and 132 are exactly engaged with each other, respectively. Specifically, inclined ends of the hooks 120 and 122 are easily inserted into the corresponding grooves 130 and 132 as the inclined ends of the hooks 120 and 122 are slightly curved inward. When the inclined ends of the hooks 120 and 122 reach the inner ends of the grooves 136 and 312 corresponding to the ends of the hooks 120 and 122, the ends of the hooks 120 and 122 return to their original shapes. As a result, the engagement between the hooks 120 and 122 and the corresponding grooves 130 and 132 is accomplished.

The hooks 130 and 132 and the corresponding grooves 130 and 132 are spaced apart from each other, respectively, and, as a result, the grooves 150 and 152 are formed therebetween, respectively. Specifically, the upper battery receiving part 110 and the lower battery receiving part 112 are constructed in the form of approximately circular outer circumferential surfaces corresponding to the circular outer circumferential surfaces of the respective unit cells. The upper battery receiving part 110 and the lower battery receiving part 112 are integrally connected with each other at the middle part 170 where the upper battery receiving part 110 and the lower battery receiving part 112 intersect, whereas the opposite sides of the upper battery receiving part 110 and the lower battery receiving part 112 are spaced apart from each other. The grooves 150 and 152 may be used as the coolant flow channel, whereby heat generated from the unit cells received in the upper battery receiving part 110 and the lower battery receiving part 112 is effectively removed.

The whole structure of the spacer 100 is illustrated in detail in a see-through view of FIG. 4.

Figure 5:
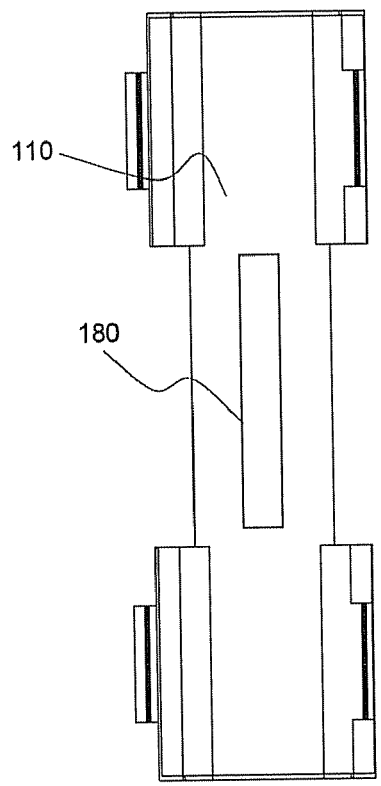
FIG. 5 is a plan view illustrating an assemblable spacer for battery module preparation according to another preferred embodiment of the present invention.

FIG. 5 is a plan view illustrating an assemblable spacer for battery module preparation according to another preferred embodiment of the present invention.

Referring to FIG. 5, a spacer 100a is characterized in that the spacer 100a is provided with a through-hole 180, through which unit cells (not shown) mounted to the spacer 100a communicate with each other. Specifically, the through-hole 180 extends from the middle part of an upper battery receiving part 110 to the middle part of a lower battery receiving part (not shown). The through-hole 180 serves as a flow channel, through which a coolant, such as air, flows, while the batteries are not in contact with each other.

Figure 6:
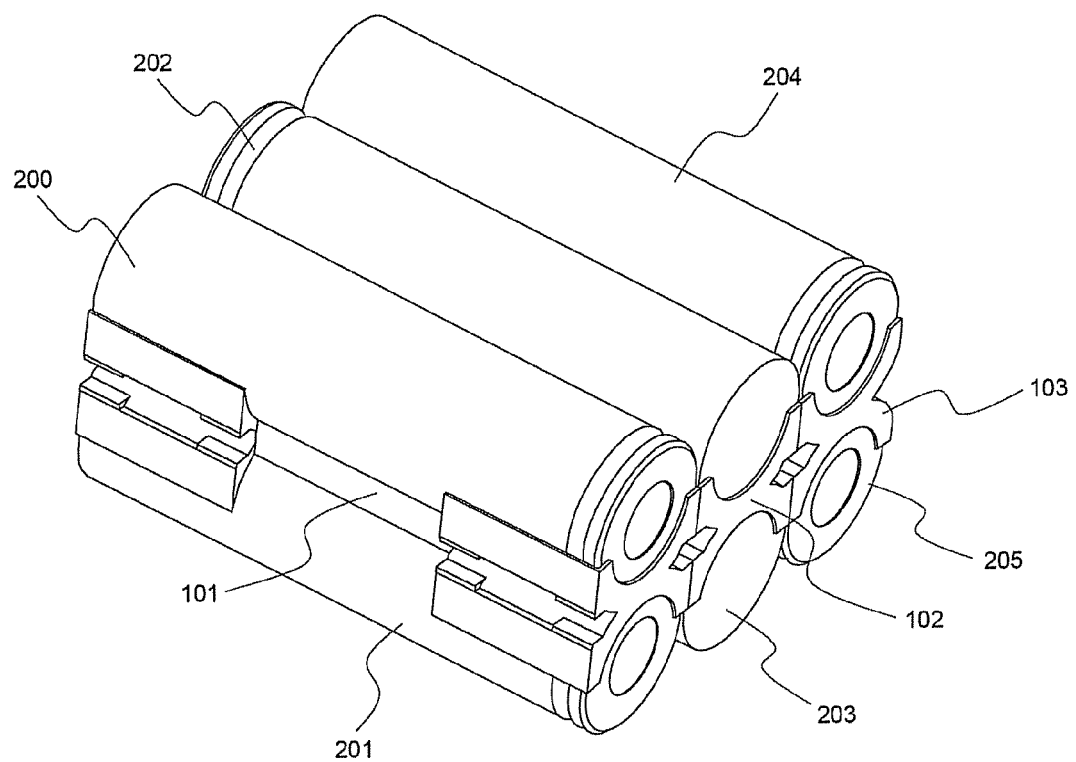
FIG. 6 is a perspective view illustrating cylindrical batteries mounted to a plurality of assembled spacers, one of which is shown in FIG. 1.

FIG. 6 is a perspective view typically illustrating a battery module including cylindrical batteries mounted to a plurality of assembled spacers, one of which is shown in FIG. 1.

Referring to FIG. 6, a battery module 300 is manufactured by coupling three spacers 110 as such shown in FIG. 1 with each other in the lateral direction and receiving cylindrical batteries 200, 201, 203 . . . into upper and lower battery receiving parts (not shown). Consequently, the battery module 300 includes a total of six unit cells. For example, the batteries 200 and 201 mounted respectively to the upper and lower parts of the first spacer 101 are oriented such that electrode terminals of the batteries 200 and 201 are directed in the same direction. The batteries 202 and 203 mounted respectively to the upper and lower parts of the second spacer 102 are also oriented such that electrode terminals of the batteries 202 and 203 are directed in the same direction. At this time, the batteries 202 and 203 of the second spacer 102 are oriented in the opposite direction to the batteries 200 and 201 of the first spacer 101. The batteries 204 and 205 of the third spacer 103 are oriented in the same direction as the batteries 200 and 201 of the first spacer 101. This battery arrangement structure is preferable when the batteries mounted to the upper and lower parts of the respective spacers 101, 102, and 103 are connected in parallel with each other, whereas the batteries adjacent to each other in the lateral direction are connected in series with each other.

Also, when the respective spacers 101, 102 and 103 are connected with each other in the lateral direction, the battery module 300 is provided with horizontal passageways 190, which are formed between the respective spacers 101, 102, and 103 by grooves as such shown in FIGS. 1 and 2. These horizontal passageways 190 may be used as coolant flow channels.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the assemblable spacer for battery module preparation according to the present invention has the effect of stably mounting cylindrical unit cells while preventing the occurrence of internal short circuits, manufacturing a structurally stable battery module, and effectively removing heat generated during charge of the cylindrical unit cells. Furthermore, the spacers can be easily assembled with each other depending upon the number of the unit cells required in manufacturing the battery module.

What is claimed is:

1. A battery module including cylindrical batteries disposed on a plurality of spacers assembled side-by-side, wherein each spacer of the plurality of spacers comprises:
   battery receiving parts disposed at a top surface and a bottom surface of a frame of each spacer, in a form that surfaces of the battery receiving parts are toward an outside in opposite directions, respectively, the battery receiving parts having semi-cylindrical inner structures corresponding to outer surfaces of the cylindrical batteries;
   coupling parts disposed at end portions of opposite sides of the battery receiving parts, between the battery receiving part on the top surface and the battery receiving part at the bottom surface, respectively, wherein the coupling parts are engageable with and disengageable from coupling parts of another spacer of the plurality of spacers; and
   a through-hole formed through a middle part of each spacer such that the cylindrical batteries disposed on the battery receiving parts fluidly communicate with each other via the through-hole,
   wherein the coupling parts comprise:
      a hook disposed at a first side of each of the battery receiving parts; and
      a groove disposed at a second side of the each of the battery receiving parts, the second side being disposed substantially opposite to the first side, the groove having a structure corresponding to the hook,
      wherein depressions are formed in the middle parts of the spacer, where the coupling parts are not formed, at the opposite sides of the spacer, respectively,
      wherein side grooves are disposed along opposite sides of the battery receiving parts except for contact regions of middle parts of the battery receiving parts where two semicircles join, respectively, and
   wherein horizontal passageways are formed by the side grooves in an assembled configuration and function as coolant flow.

2. The battery module according to claim 1, wherein when a spacer of the plurality of spacers is an outermost member of the battery module, no coupling parts are disposed at a side of the spacer of the plurality of spacers constituting an outermost side surface of the battery module, or at least one of the groove and the slide depression are formed at the side of the spacer of the plurality of spacers constituting the outermost side surface of the battery module.

3. The battery module according to claim 1, wherein the each spacer of the plurality of spacers further comprises:
   skirts protruding from opposite ends of the battery receiving parts, respectively, to stably fix the cylindrical batteries.

4. The battery module according to claim 3, wherein each of the skirts is formed of a U-shaped plate to partially surround circular outer circumferential surfaces of opposite ends of the cylindrical batteries while exposing electrode terminals of the cylindrical batteries.

5. The battery module according to claim 1, wherein the battery module further comprises thermistors disposed in spaces formed by the side grooves of each spacer.

6. A battery module including cylindrical batteries disposed on a plurality of spacers assembled side-by-side, wherein each spacer of the plurality of spacers comprises:

battery receiving parts disposed at an upper surface and a lower surface of a frame of each spacer, respectively, wherein the battery receiving parts each face an outside in opposite directions of each other, and having semi-cylindrical inner structures corresponding to outer surfaces of the cylindrical batteries coupling parts disposed at end portions of opposite sides of the battery receiving parts, respectively, wherein the coupling parts are engageable with and disengageable from coupling parts of another spacer of the plurality of spacers; and a through-hole formed through a middle part of each spacer such that the cylindrical batteries disposed on the battery receiving parts fluidly communicate with each other via the through-hole, wherein the coupling parts comprise:

a slide protrusion disposed at a first side of the each of the battery receiving parts; and a slide depression disposed at a second side of the each of the battery receiving parts, the second side being disposed substantially opposite to the first side, the slide depression having a structure corresponding to the slide protrusion, wherein side grooves are disposed along opposite sides of each spacer, respectively, and wherein horizontal passageways are formed by the side grooves in an assembled configuration and function as coolant flow.

* * * * *